United States Patent [19]

Zwart

[11] Patent Number: 4,487,221

[45] Date of Patent: Dec. 11, 1984

[54] DEVICE FOR TEMPORARILY SEALING A PIPE

[76] Inventor: Klaas Zwart, The Quay, Newburgh, Aberdeen, Scotland

[21] Appl. No.: 403,502

[22] PCT Filed: Nov. 16, 1981

[86] PCT No.: PCT/GB81/00245

§ 371 Date: Jul. 19, 1982

§ 102(e) Date: Jul. 19, 1982

[87] PCT Pub. No.: WO82/01736

PCT Pub. Date: May 27, 1982

[51] Int. Cl.³ .................. E21B 33/00; F16L 55/10
[52] U.S. Cl. .................. 137/508; 166/317; 166/321
[58] Field of Search .......... 166/317, 322, 323, 325, 166/133, 188, 319; 137/508, 493.1, 512.2

[56] References Cited

U.S. PATENT DOCUMENTS

| | | | |
|---|---|---|---|
| 1,356,298 | 10/1920 | McGregor | 137/512.2 |
| 2,730,124 | 1/1956 | Buchanan | 137/493.1 |
| 3,130,789 | 4/1964 | Alexander et al. | 166/317 |
| 3,183,040 | 5/1965 | Gold | 137/508 |
| 3,306,363 | 2/1967 | McZilkey | 166/152 |
| 3,353,609 | 11/1967 | Jensen | 166/317 |
| 3,356,140 | 12/1967 | Young | 166/128 |
| 3,457,994 | 7/1969 | Stachowiak | 166/125 |
| 3,473,606 | 10/1969 | Page | 166/322 |
| 3,485,298 | 12/1969 | Kisling | 166/331 |
| 3,570,595 | 3/1971 | Berryman | 166/128 |

Primary Examiner—Stephen J. Novosad
Assistant Examiner—Michael Starinsky

[57] ABSTRACT

A device for temporarily sealing a pipe; for example production tubing of an oil well comprises a body (8) defining a cylindrical chamber (8') and a piston (15) arranged to move in the chamber (8'). The chamber (8') has an outlet (14) at one end thereof, an inlet (12) axially spaced from the outlet (14), the chamber (8') providing a passageway from the inlet (12) to the outlet (14) for fluid flow through the chamber (8'). This piston (15) is movable from a first position to a second position. The piston (15) is resiliently biased towards its first position by means of a spring (21) and, on reaching the second position, is locked in that position. The piston (15) has mounted thereon, a collet (16) which seals the passageway, and which is movable relative to the piston (15), when the latter is locked in its second position, so as to open the passageway. The collet (16) has one face exposed to the exterior of the chamber (8') via the inlet (12), and another face exposed to the exterior of the chamber (8') via the outlet (14), and is movable by the application of differential pressure between the inlet (12) and outlet (14).

The device overcomes the problems associated with existing devices which are their susceptibility to damage and to the effect of debris.

9 Claims, 6 Drawing Figures

DEVICE FOR TEMPORARILY SEALING A PIPE

BACKGROUND OF THE INVENTION

This invention relates to a device for temporarily sealing a pipe, as for example the production tubing of an oil well.

Devices of this kind are known and are sometimes referred to as "subs". "Subs" are usually used in conjunction with plugs for production tubing; the subs are normally closed but, when open, provide a passage for the flow of oil through the plug, thus enabling a well to start or recommence production without requiring removal of the plug.

"Subs" which are openable upon the application thereto of pressure by pumping oil or mud down the production tubing are known as "pump out subs".

A previously known "pump out sub" comprises a plunger held by shear pins in a position in which it seals an opening through which oil may pass up the production tubing. The shear pins may be sheared by the pressure of the pumped fluid so that the plunger drops away from the sealing position.

A second previously known "pump out sub" comprises a disc which is sheared from the sub when a sufficient pressure of fluid is applied.

These known "pump out subs" have the disadvantage that deposition of debris, such as sand or shale, will result in formation of a plug of debris on the plunger or disc when fluid is pumped under pressure onto it. In consequence greater pressure must be applied before the pins or disc will shear than if the plug of debris were not present. Also the shear parts may be prematurely sheared by jarring the plug when it is set down inside the tubing by wireline.

A further disadvantage of the aforesaid "pump out subs" is the high pressure differential necessary to effect shearing. Thus for shear disc holding a well pressure of 2000 psi it is usually necessary to apply at least 3000 psi to produce shearing; this high pressure differential of 1000 psi necessitates the use of well Christmas trees capable of coping with the high pressures required for sub opening, and imposes restrictions on the use of subs in wells in which the Christmas trees are rigged to cope with relatively low pressures.

SUMMARY OF THE INVENTION

According to this invention there is provided a device for temporarily sealing a pipe, as for example the production tubing of an oil well, comprising a body defining a cylindrical chamber, and a piston arranged to move in the chamber; the chamber having an outlet at one end thereof, an inlet axially spaced from the outlet, and the chamber providing a passageway from the inlet to the outlet for fluid flow through the chamber; the piston being movable from a first position to a second position, characterized in that the piston has associated therewith an annular member which seals the passageway, and which is movable relative to the piston when the piston is in the second position, by the application of differential pressure, so as to open the passageway.

Devices in accordance with the present invention will be referred to herein sometimes as "pump open subs".

In devices described below the annular member is a collet mounted on the piston.

In preferred embodiments described hereunder the piston is moveable, in said chamber, from the first to the second position under the influence of fluid pressure applied to an end face thereof.

In the preferred embodiments, the device is adapted such that when installed in a pipeline the piston can be moved from the first position to the second position by increasing the fluid pressure at the outlet side of the chamber, and the moveable member may then be moved, to permit said fluid flow, by reducing the said outlet side pressure to below the pressure at the inlet(s).

In preferred embodiments of the device, the piston is resiliently biased towards the first position by for example, compression springs.

Preferably the moveable member is movable from the piston under the influence of a fluid pressure force applied to a surface thereof.

It is preferred that the devices in accordance with the invention comprise means for locking the piston into the second position.

In the embodiments described below the piston comprises at least one flexible tongue having a shoulder portion adapted to snap into engagement with a complementary shoulder portion fixed with respect to the casing upon the piston reaching the second position, whereby coaction of the shoulders prevents movement of the piston back towards the first position. In the embodiments described the piston has a depending skirt, and said flexible tongue is defined by an elongate generally U-shaped slot formed in said skirt.

Usually the moveable member is a collect which in the second position of the piston has one of its end faces exposed to the exterior of the chamber via said inlet or inlets and another end face exposed to the exterior of the chamber via said outlet, and is thus moveable, to a non-sealing position, under the influence of a pressure differential between said end faces. In one embodiment the collet is resiliently biased towards the first position. Possibly the piston may be provided with a shear pin, adapted to co-act with a shear surface fixed with respect to the casing, the arrangement being such that it is necessary to shear the pin, during movement of the piston towards the second position, before the piston can reach the second position.

DESCRIPTION OF THE INVENTION

In order that the invention may be more fully understood embodiments in accordance therewith will now be described by way of example only with reference to the accompanying drawings in which.

In the drawings like parts in the various embodiments are given the same reference numbers.

Figure 1:
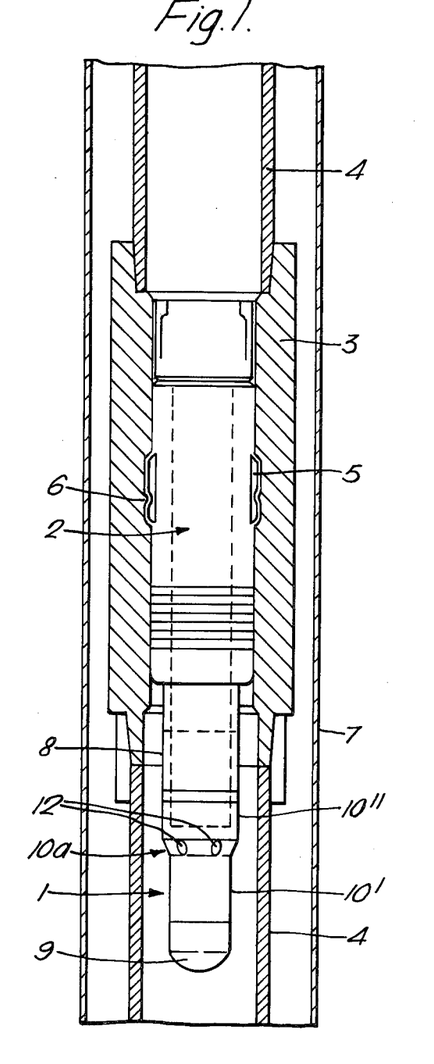
FIG. 1, is a section through an oil well production pipeline with a plug and "pump open sub" in position.

FIG. 1 is a general view showing how the pump open subs 1 described below are usually located in position in production tubing 4 within an outer tube or casing 7. The sub is connected to a plug 2 in a conventional manner; the plug 2 is held in a tubing nipple 3, provided in conventional manner on riser pipe 4, by means of locking keys 5 on the plug and keyways 6 in the nipple 3.

Figure 2:
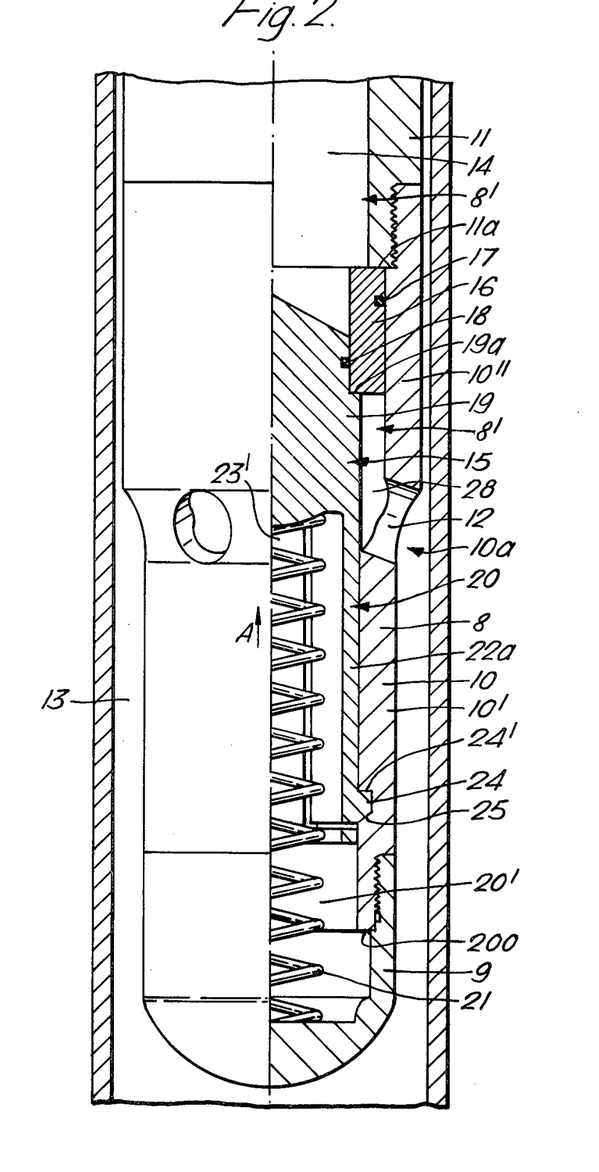
FIG. 2 is a partial cross sectional elevation of a "pump open sub" in its closed condition.

Referring now, also, to FIG. 2 the pump open sub 1 has an outer casing 8 defining a chamber 8'. The bottom of the casing 8 is closed by a cap 9. The casing 8 comprises an intermediate sleeve 10 threadedly connected to an upper sleeve 11. Intermediate sleeve 10 is formed with a lower portion 10' and an upper portion 10" of larger diameter than the lower portion 10', connected via an inclined shoulder portion 10a. A plurality of openings 12 are formed in shoulder portion 10a so as to connect the chamber 8' with the annular space between the sub and the inner surface of the production tubing 4 on the down side of the plug 2. The casing 8 has an outlet at the top whereby the upper part of the chamber 8' has an upside portion 14 which communicates via the plug 2 with the production tubing 4 on the upside of the plug 2, and thence with the well head. In the open condition (see FIG. 3) of the sub, to be described below, oil may flow up the production tubing 4, through openings 12, into chamber 8' through upside portion 14 and then through the production tubing 4 on the upside of the plug 2 to the well head: as shown in FIG. 2 however, such flow is prevented by the sealing function of the piston 15 and collet 16.

Figure 3:
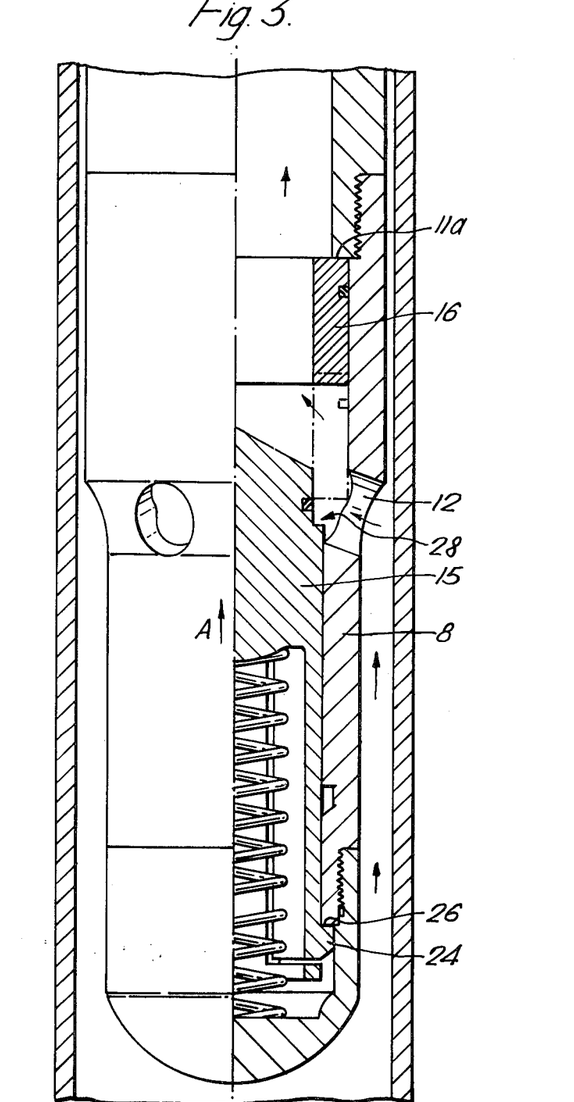
FIG. 3 is a view similar to that of FIG. 2 but showing the sub in its open condition.
Figure 4:
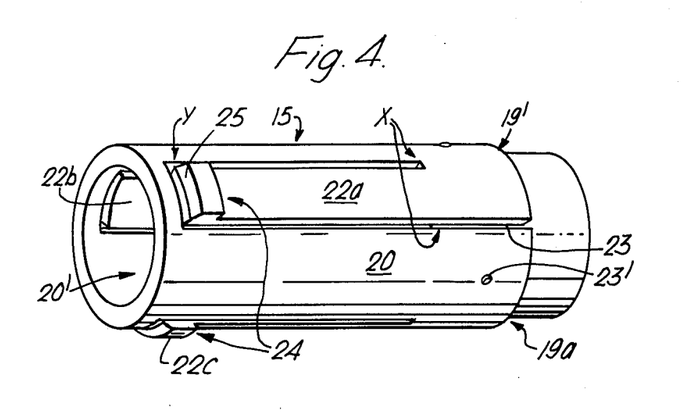
FIG. 4 is a perspective view of a piston of the embodiment shown in FIGS. 2 and 3.

Referring also to FIG. 4 it will be seen that piston 15 has a head portion 19 and depending skirt portion 20 defining an inner space 20' within which a spiral compression spring 21 is located. The spring 21 engages the inner faces of head portion 19 and the cap 9 so as to urge the piston in the direction of arrow A i.e. so as to close the sub. The head portion 19 is stepped at 19' so as to define an annular shoulder 19a. The collet 16 is in the form of a short, hollow, cylinder fitting snugly, but slidably within the upper portion 10" of the casing 10, between the shoulder 19a and an upper shoulder 11a formed by the end of section 11. O-rings 17 and 18 provide fluid tight seals between collet 16 and the upper portion of the casing 11 and the head portion 19 respectively. It will be appreciated from FIGS. 2 and 3 that the collet is held between shoulders 19a and 11a when the sub is in the closed condition (FIG. 2) whereby it cannot move longitudinally of the sub, but would be enabled to undergo such longitudinal movement only upon increased separation of the shoulders 19a and 11a.

Referring again to piston 15 it will be seen from FIG. 4 that three longitudinally extending tongues 22a, , 22b, 22c are formed in the skirt portion 20 being defined by generally U-shaped slots cut or otherwise formed through the thickness of the skirt material and extending from a position X at the head end of the piston, to a position Y adjacent the open end of skirt 20. One arm of at least one of the slots is extended up to the shoulder 19a in the form of a groove 23 for a purpose to be described below.

A small, for example 3 mm diameter hole 23' is formed through the thickness of the skirt about mid way between each tongue and at a position such that, with the piston 15 and collet 16 in the closed condition, the hole is just higher than the lower face of the wall of openings 12.

Each tongue 22a, 22b and 22c is provided at its free end with a flange or shoulder 24 extending outwardly from the skirt. Each flange 24 in section has a front face 24' extending normal to the outer face of the skirt 20 and a sloping rear face 25'. The flanges, in the closed condition of the sub being located in complementary recesses in the inner face of lower portion 10'.

In operation, to open the sub, fluid such as oil or mud can be pumped down the production tubing 4 so as to exert a downward pressure on upper face of collet 16 and the upper face of piston head 19. When this pressure exceeds the combined upward pressure of the fluid downside of the sub (which is the fluid pressure in chamber 20') the pressure exerted by spring 21 and the resistance to fluid flow from the chamber 20', the piston 15 and collet 16 together begin to move downwardly i.e. in a direction opposite that of arrow A. The sloping faces 25 of flanges 24 coact with the complementary walls of the recesses so as to cause the tongues 22a, 22b, 22c to be pushed inwardly as the piston moves down the chamber 8' towards the closed end. When the flanges pass the bottom edge 200 of the lower sleeve portion 10' the flanges 24 are thereupon free to snap outwardly so as to bring the tongues 22a, 22b, 22c into their relaxed condition again. When this occurs fron faces 24' of the flanges 24 will engage with the end face 26 of the lower sleeve portion 10' to prevent the piston 15 moving in the direction of arrow A: thus the flanges 24 and the end face of the lower sleeve portion act to lock the piston 15 in the position shown in FIG. 3. During the downward movement of collet 16 with the piston 15 the collet remains in fluid tight relationship with the head 19 and upper sleeve portion 10" but the interior wall of the chamber is so configured that it contacts, and prevents further downward movement of the collet 16 when the collet 16 is at the position shown in dotted lines in FIG. 3 i.e. the collet will have the position shown in dotted lines in FIG. 3: this means that at this stage of the operation the piston and collet still substantially seal chamber 14 from opening 12.

However when the piston 15 has finally reached the position shown in FIG. 3 O-ring 18 has moved to just below collet 16 thus breaking the fluid tight seal, which has the result of allowing slight leakage of fluid from the top side to the bottom side of the sub. The resulting slight pressure drop can serve as an indicator that the sub has been put in the 'locked position'.

In order to allow fluid access through openings 12 to chamber 14 all that is required is to reduce the fluid pressure applied to the piston 15 and collet 16, when the force exerted by fluid pressure on the bottom face of the collet 16 exceeds that exerted on the top face of the collet the collet will be forced upwardly in the direction of arrow A until the substantial sealing relationship between it and head 19 of piston 15 is destroyed: fluid will then flow freely through opening 12 and chamber 14 to the upside portion of production tubing 4. Usually the flowing fluid will force the collet 16 back to its original topmost portion in which it engages the bottom face of upper sleeve 11.

It will be appreciated that the slot defining tongue 22a and groove 23 formed in skirt 20 provide fluid flow communication between chamber 20' and the exterior of the sub via openings 12: this will apply at any position of the piston 15 in its downward travel to the locked condition as the said slot and groove 23 give access from chamber 20' to the space 28 that exists between the head 19 and the inner surface of the wall portion 10". Accordingly as the piston 15 is forced towards its locked position the fluid in chamber 20' is exhausted therefrom. The resistance to the flow of fluid from chamber 20' through the slot and groove 23 provide a shock absorbing effect which assists the spring in counteracting sudden shocks experienced e.g. when pointing the sub in the production tubing or surges in pressure, which may tend inadvertently to open the sub.

The holes 23′ act as air vents when the sub is being assembled. Thus the piston may be inserted into a chamber defined by cap 9 and lower cylindrical wall 10′ which is filled e.g. with oil; air being expelled through the holes as the piston descends to the position shown in FIG. 2. The result is only a very small volume of air in the piston. It will be appreciated that as air is considerably more compressible than oil it is desirable to reduce the volume of air in space 20′ to ensure more positive control of the piston and make it less susceptible to rapid movement upon experiencing sudden shocks or surges.

Figure 5:
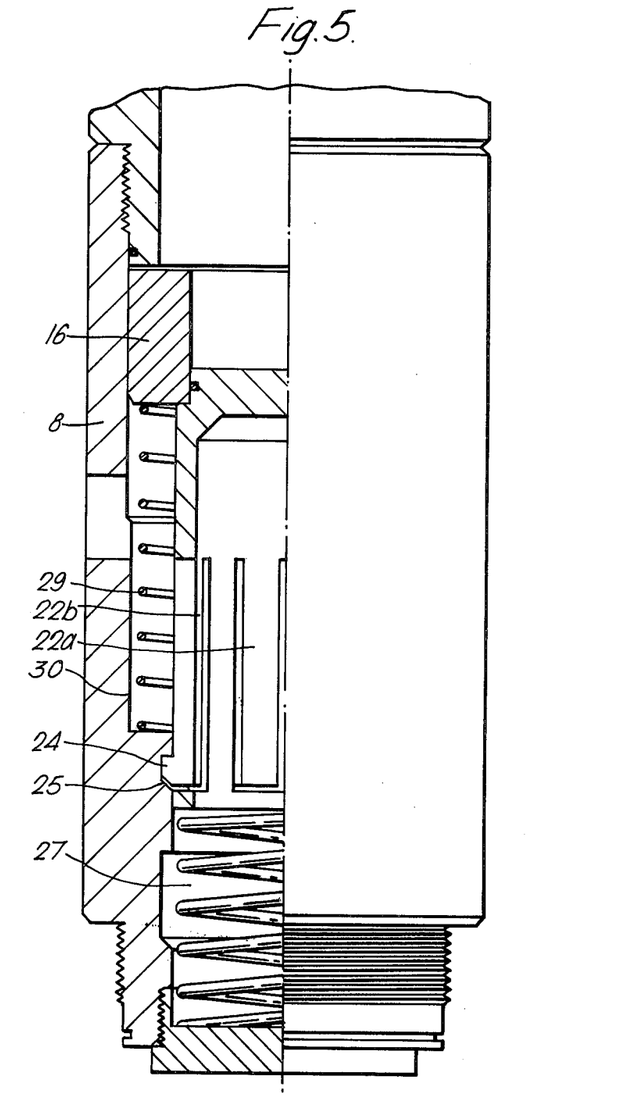
FIG. 5 is a partial cross sectional elevation of another form of "pump open sub"

The embodiment shown in FIG. 5 is generally similar to the first embodiment but additionally has a spring 29 to bias the collet 16 towards the upper position shown. No grooves 23 extends from the U-shaped slots within which the tongues 22a, b, c extend, but fluid escaping from space 27 through the U-shaped slots can flow through recess 30 cut in the intermediate wall 8 and which accommodates the spring 29.

Figure 6:
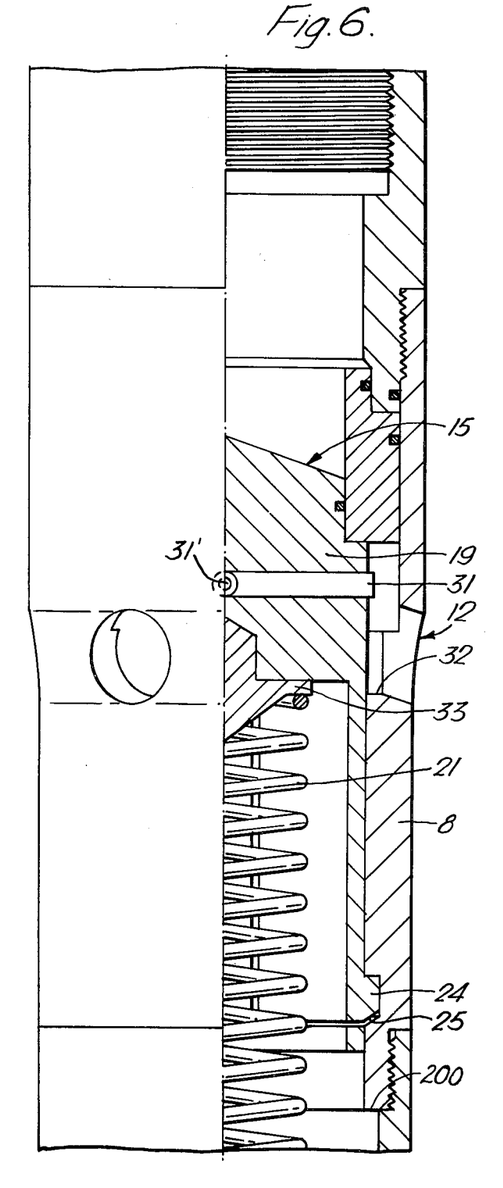
FIG. 6 is a partial cross sectional elevation of yet another form of "pump open sub".

The third embodiment illustrated in FIG. 6 includes one or more shear pins 31, made for instance of brass. The pin or pins are located in head 19 of piston 15 and are fixed in position by a respective screw(s) 31′. The coacting surface on which the pin(s) 31 will shear is surface 32, this being the bottom surface of opening(s) 12 in casing 8. The flange 32 and pin 31 are suitably positioned relatively to each other such that the pin 31 is not sheared until the flanges 24 of the resilient tongues 23 are positioned substantially opposite bottom edge 200 of casing 8.

By virtue of the provision of the shear pin the sealing means are not set in their lower most position (see FIG. 3) until a predetermined stepwise pressure increase on topside of the piston is applied. This provides an added safeguard against accidental opening of the pipeline.

This embodiment further includes a spring seat 33, firmly set in the head 19 of the piston, for locating the spring 21.

The seat 33 is rotatable with respect to the piston 15 and by being interposed between spring 21 and the inner face of head 19 of the piston the seat also permits rotation of the spring thus allowing cap 9 to rotate and thereby be removed during dismantling the sub. The sub described herein may be located in and removed from the production tubing using a conventional wireline technique.

I claim:

1. A valve device for temporarily sealing a pipe comprising a cylindrical body defining a chamber having a first and second port, said first port being positioned intermediate the axial ends of said chamber, and said second port being positioned at one axial end of said chamber, a piston axially slidable within said cylindrical body, said piston and said cylindrical body co-operating to define an annular passage between them, said passage communicating said first port with said second port when the valve device is open, an annular member arranged within said cylindrical body, said annular member having limited axial movement between two fixed planes perpendicular to the axis of said cylindrical body and being positively restricted in its movement away from a first one of said planes towards the second one of said planes by the adjacent end portion of said piston, said annular member being in sealing contact with said cylindrical body throughout its axial movement and acting so as to seal said passage when in conjunction with said piston, said piston being movable at least between a first position where said passage is positively sealed by said annular member situated at said first one plane and a second position in which the configuration of said passage is dependent on the displacement of said annular member from said second one plane towards said first one plane, and retaining means for restraining said piston, when in its second position, from moving towards its first position.

2. A device as claimed in claim 1 characterized in that said annular member is a cylindrical member having an axial and portion adjacent to said piston which has an inner diameter which is greater than the diameter of the adjacent end of said piston, and said passage is sealed by means of an axial overlap between the inner cylindrical surface of said annular member and the adjacent outer cylindrical surface of said piston.

3. A device as claimed in claim l, characterised in that said annular member is resiliently biased towards said one axial plane.

4. A device as claimed in claim 1, characterised in that piston is resiliently biased towards said first position.

5. A device as claimed in any of claims 1 to 4, characterised in that said retaining means comprises at least one flexible tongue formed on said piston, said tongue having a shoulder portion adapted to snap into engagement with a complementary shoulder portion fixed with respect to the cylindrical body upon said piston reaching the second position, whereby coaction of the shoulders prevents movement of the piston towards the first pisition.

6. A device as claimed in claim 1 wherein the piston is provided with a shearing pin adapted to co-act with a shear surface fixed with respect to the cylindrical body, the arrangement being such that it is necessary to shear the pin, during movement of the piston towards the second position thereof, before the piston can reach the second position.

7. A valve device for temporarily sealing a pipe comprising a cylindrical body defining a chamber having a first and second port, said first port being positioned intermediate the axial ends of the said chamber, and said second port being positioned at one axial end of said chamber, a piston axially slidable within said cylindrical body, said piston and said cylindrical body co-operating to define an annular passage between them, said passage communicating said first port with said second port when the valve device is open, an annular member arranged within the said cylindrical body, said annular member having limited axial movement between two fixed planes perpendicular to the axis of said cylindrical body and being positively restricted in its movement away from a first one of said planes by the adjacent end portion of said piston, said annular member being in sealing contact with said cylindrical body throughout its axial movement and acting so as to seal said passage when in conjunction with said piston, said piston being movable at least between a first position where said passage is positively sealed by said annular member situated at said first one plane and a second position in which the configuration of said passage is dependent on the displacement of said annular member from the second said plane, and retaining means for restraining said piston, when in its second position, from moving towards its first position; said cylindrical body being closed at an end remote, from the said second port, said piston being position said cylindrical body between said second port and said closed end, and a restricted passage being provided from the exterior of the device to a second chamber defined by said piston and said closed end.

8. A device as claimed in claim 7 characterized in that said piston has a skirt which extends into said second chamber and at least one flexible tongue, said tongue having a shoulder portion adapted to snap into engagement with a complementary shoulder portion fixed with respect to said cylindrical body upon said piston reaching the second position, whereby coaction of said shoulder portions prevents movement of said piston towards the first position, said tongue being defined by an elongate generally U-shaped slot formed through the wall of said skirt, said slot comprising said restricted passage.

9. A valve device for temporarily sealing a pipe comprising a cylindrical body defining a chamber having a cylindrical body defining a chamber having a first and second port, said first port being positioned intermediate the axial ends of said chamber, and said second port being positioned at one axial end of said chamber, a piston axially slidable within said cylindrical body, said piston and said cylindrical body co-operating to define an annular passage between them, said passage communicating said first port with said second port when the valve device is open, an annular member arranged within the said cylindrical body, said annular member having limited axial movement between two fixed planes perpendicular to the axis of the said cylindrical body and being positively restricted in its movement away from a first one of said planes by the adjacent end portion of said piston, said annular member being in sealing contact with said cylindrical body throughout its axial movement and acting so as to seal said passage when in conjunction with the said piston, said piston being movable at least between a first position where said passage is positively sealed by said annular member situated at said first one plane and a second position in which the configuration of said passage is dependent on the displacement of said annular member from the second said plane, and retaining means for restraining said piston, when in its second position, from moving towards its first position, in its first position the displacement of said piston being restricted by said annular member, and said piston having a longer axial displacement than said annular member such that in its second position a restricted pathway is provided by said piston and said annular member within said passage between said first port and said second port.

* * * * *